United States Patent [19]

Kawasaki et al.

[11] Patent Number: 4,986,738

[45] Date of Patent: Jan. 22, 1991

[54] AIRFLOW CONTROL SYSTEM PUMP AND HOUSING

[75] Inventors: Nozomu Kawasaki, Takatsuki, Japan; Terence A. Scott, Carthage, Mo.

[73] Assignee: Leggett & Platt Incorporated, Carthage, Mo.

[21] Appl. No.: 278,191

[22] Filed: Nov. 30, 1988

[51] Int. Cl.⁵ .............................................. F04B 49/08
[52] U.S. Cl. ......................................... 417/304; 5/453; 5/455; 137/116.3; 137/505.11; 137/498
[58] Field of Search .................... 5/453, 455; 417/304, 417/312; 137/116.3, 116, 505.11, 498, 906

[56] References Cited

U.S. PATENT DOCUMENTS

| | | | |
|---|---|---|---|
| 3,747,627 | 7/1973 | Christie | 137/116.3 |
| 3,913,613 | 10/1975 | Kostjurin et al. | 137/906 |
| 4,171,004 | 10/1979 | Cerrato et al. | 137/505.11 |
| 4,694,520 | 9/1987 | Paul et al. | 5/453 |
| 4,711,275 | 12/1987 | Ford et al. | 5/455 |
| 4,715,787 | 12/1987 | Hung | 417/234 |
| 4,715,790 | 12/1987 | Jijima | 417/312 |
| 4,722,105 | 2/1988 | Douglas | 5/453 |
| 4,757,564 | 7/1988 | Goodale | 5/451 |
| 4,797,962 | 1/1989 | Goode | 5/455 |
| 4,810,169 | 3/1989 | Kränzle | 417/313 |

Primary Examiner—Leonard E. Smith
Assistant Examiner—Robert N. Blackmon
Attorney, Agent, or Firm—Wood, Herron & Evans

[57] ABSTRACT

A housing containing an air pump and an air pressure supply system for supplying air to a body support, such as an air mattress. The housing contains, in addition to the air pump, diaphragm type pressure regulators and diaphragm type surge check valves, as well as passageways and pressure chambers for interconnecting the pump to the pressure regulators and surge check valves.

19 Claims, 7 Drawing Sheets

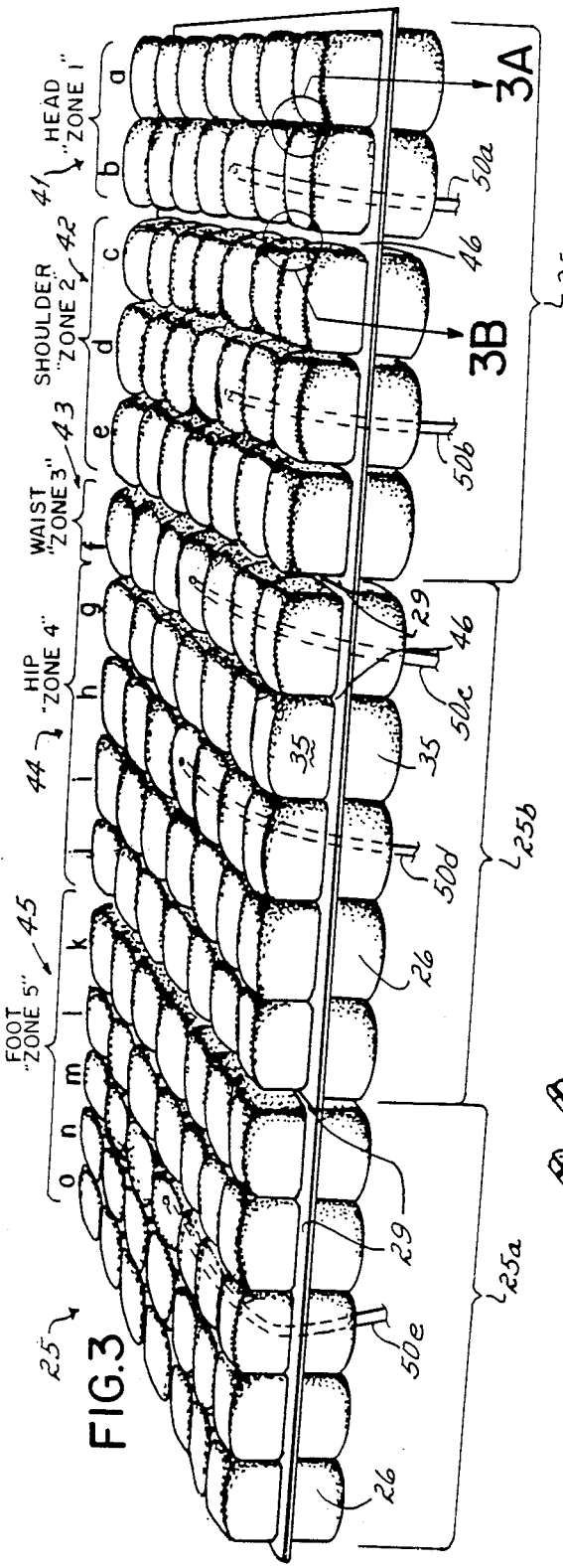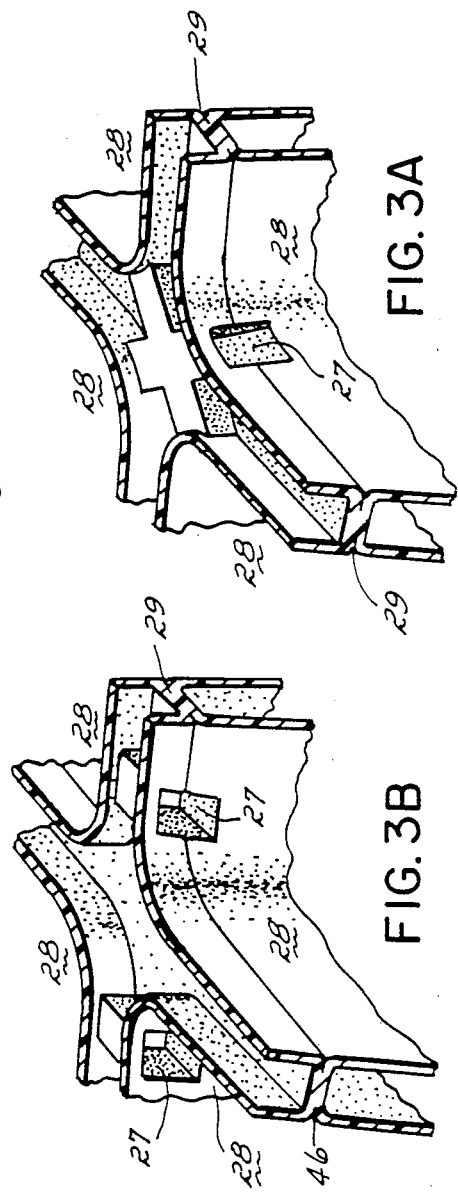

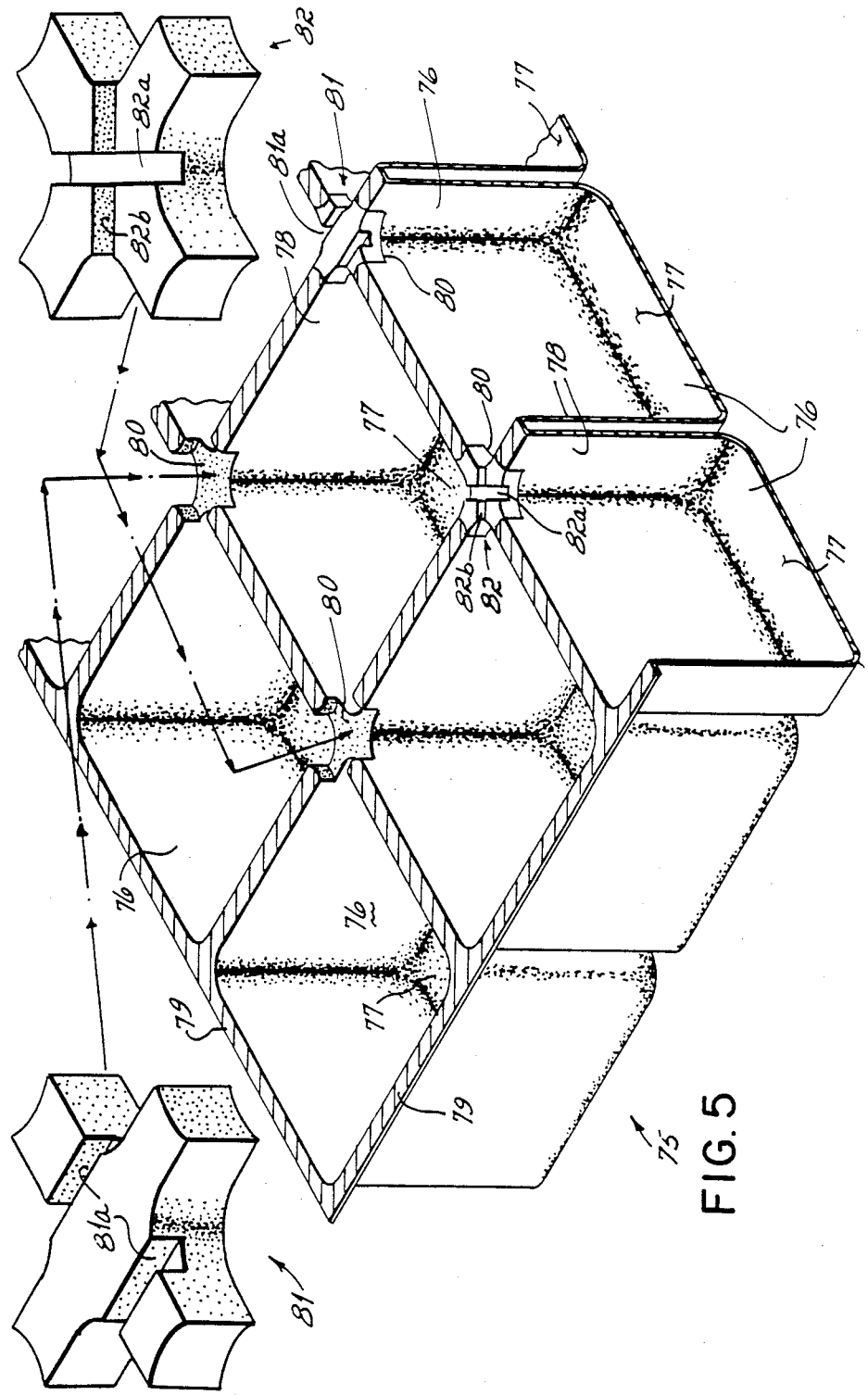

AIRFLOW CONTROL SYSTEM PUMP AND HOUSING

This invention relates to fluid body support systems, and, more particularly, to fluid bed sleeping systems intended for home use and for some medical applications where increased comfort is of benefit to the patient.

Restful sleeping is usually associated with comfort, and comfort is in turn associated with minimum body shifts during the course of a night. Recognized major causes of body shifts while sleeping, and hence, poor sleep, are the buildup of pressure on prominences of the body and poor postural support. Pressure on prominences of the body causes tissues of the body at those prominences to be put in compression so as to restrict capillary blood flow to those prominences. The pressure which causes a discontinuance of capillary blood flow is called ischemic pressure. Fifteen inches of water (28 mmHg) is normally considered to be the ischemic threshold. Those parts of the body which are subjected to pressures above the ischemic threshold cause discomfort and hence, cause the person to shift his body to eliminate the distress and remove the excessive pressure from those prominences.

The lack of postural support from an improper mattress causes distortion of the spine. Distortion of the spine can occur within or beyond the normal physiological range of motion of the spine depending on the structural condition of the spine. As distortion occurs in the spine, ligaments are stretched and joint integrity is compromised. Nerve receptors within the ligaments and joints detect distortion and relay it to the brain where it is received on a conscious or subconscious level. Action is taken on a conscious or subconscious level to relieve the distortion by movement of the body. Spinal alignment can only be obtained when the natural curves of the body are maintained whether in the supine or side lying position.

There are in the prior art disclosures of air mattresses which attempt to maintain subischemic pressures over the full body and to provide uniform support of the body. Examples of such patents are U.S. Pat. Nos. 4,662,012; 4,005,236; and 3,605,145; and British Patent No. 1,545,806. The mattresses of these patents are all subject to the criticism that they do not provide the necessary body support for proper spinal alignment. Additionally, these mattresses of these patents are all subject to the criticism that if a person sits up in the bed or sits on the edge of the bed, the bed is subject to collapse until the person bottoms out in the bed.

SUMMARY OF THE INVENTION

It has been an objective of this invention to provide a practical air pump and airflow control system contained within a unitary housing for use in an air bed for home use and some medical applications. Such an air bed is characterized by multiple supportive zones maintained with air at normalized pressure so that uniform support is provided to all portions of the body at subischemic pressures while maintaining spinal alignment.

Still another objective of this invention has been to provide an improved pump and control system contained within a unitary housing for maintaining an air bed at normalized pressures when a person is resting atop the mattress and which is relatively inexpensive and reliable.

These objectives are achieved by a pump and airflow control system contained within a unitary housing for supplying air to a fluid mattress having a plurality of rows and columns of air pockets or cells. The rows and columns of air pockets or cells of the mattress are divided into zones, preferably five, by sealing completely between longitudinal zones. For example, one preferred form of the mattress utilizes 15 rows of cells, each row having 7 cells of equal volume. The first two rows of cells provide head support and are preferably inflated to approximately 4 inches of water. The third, fourth and fifth rows form a second section for the support of the shoulder of a person reclining atop the mattress. The shoulder section is inflated to approximately 6 inches of water. The sixth row forms a separate zone for the waist support of a person reclining atop the mattress. This waist section is inflated to approximately 11 inches of water. The fourth zone is formed by the seventh, eighth, ninth and tenth rows which support the hips at a pressure of approximately 8 inches of water. The remaining last five rows support the legs and feet of a person reclining atop the mattress and are inflated to a pressure of approximately 4 inches of water.

The five zones, with their varying normalized pressures, allow for spinal alignment by maintaining the normal curves of the body, whether in the supine or side-lying positions.

A single reciprocating diaphragm pump is utilized to inflate all five zones. This pump, as well as the airflow control system for supplying air to all five zones, is contained within a unitary housing. Pressure from the pump is caused to flow through four pressure regulators, one of which supplies air pressure to the head and foot sections of the mattress which are maintained at the same pressure. The other three pressure regulators supply the air pressure to the shoulder, waist and hip sections. The flow from all four pressure regulators passes through surge check valves located in the flow path between each pressure regulator and the mattress section which it supplies. The pressure regulators are operative to maintain the desired pressure in their respective zones either by supplying air to the zone or by connecting the mattress zone to atmosphere so as to dump air from that zone of the mattress. The pressure regulators and surge check valves of each zone are connected to the mattress by hoses which extend from the housing to the zones.

These and other objectives of this novel bed will be more fully appreciated from the following description of the drawings in which:

FIG. 3 is a perspective view of the air mattress only of FIG. 2.

FIGS. 3A and 3B are enlarged views of the respective encircled areas 3A and 3B of FIG. 3.

FIG. 5 is a fragmentary, exploded perspective view of one mold utilized in vacuum forming the sheets of the air mattress of FIG. 3.

Figure 1:
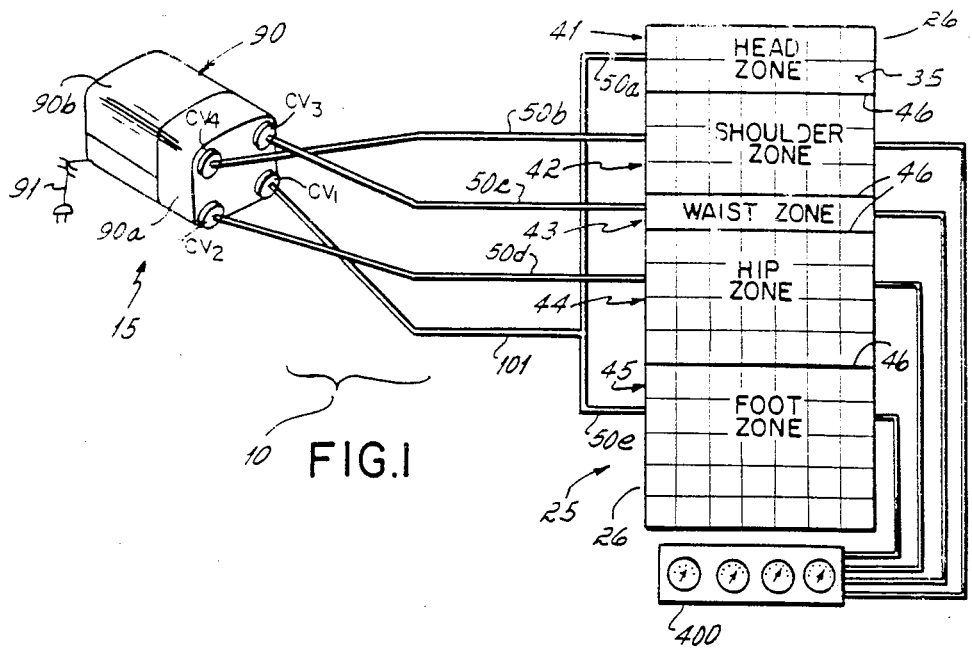
FIG. 1 is a diagrammatic illustration of an air bed incorporating the novel pump and airflow control system housing of this invention.
Figure 2:
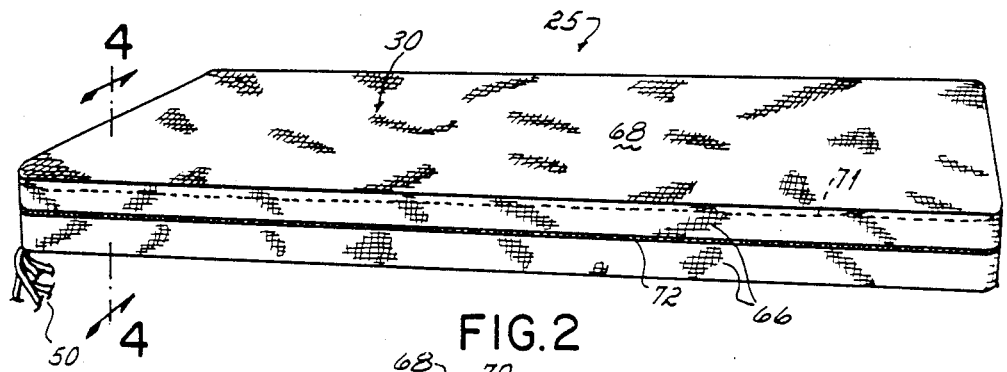
FIG. 2 is a perspective view of an air mattress and cover encasing that mattress utilized in the bed of FIG. 1.
Figure 4:
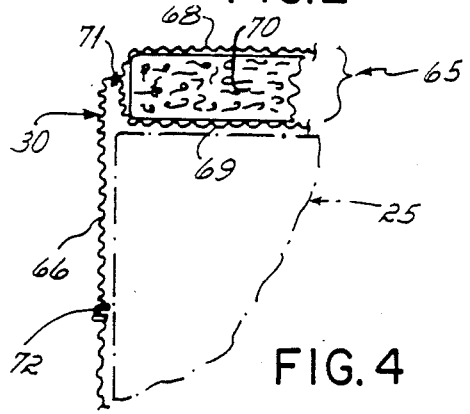
FIG. 4 is a cross-sectional view taken on line 4—4 of FIG. 2.

With reference first to FIG. 1, there is diagrammatically illustrated an air bed 10 incorporating the novel airflow control system housing 90 of this invention. This air bed comprises an air supply pump and airflow control system 15 contained within the housing 90 and operable to supply air pressure to and exhaust air pressure from an air mattress 25. As shown in FIGS. 2 and 3, the air bed 10 includes a unique cover 30 encasing and surrounding the air mattress 25.

AIR MATTRESS

The mattress 25 is formed from three separate individual sections 25a, 25b, 25c which, when placed end to end as illustrated in FIG. 3, form a complete mattress. As illustrated in FIG. 3, each section comprises five rows 26 of cells 35, each row 26 of which in the illustrated embodiment is seven cells wide.

Each mattress section 25a, 25b, 25c is formed from two sheets of 50 mil (0.050 inches) vinyl. Each sheet is heated and vacuum formed to provide a series of recesses or pockets 28 (FIGS. 3A, 3B). The two sheets overlie each other with the pockets facing each other. The sheets are sealed around the edges 29 and between adjoining pockets 28 except at the intersecting corners of the pockets.

The pockets are square in cross section with the seals 29 being formed between adjacent pockets in order to form the cells 35. As best shown in FIGS. 3A, 3B, the seals 29 between adjoining cells 35 are not completely formed within any zone. Rather, a channel or groove 27 of between ¼ inch to ½ inch in width is provided at the corners between adjacent cells. These grooves are formed in the manner described hereinbelow with vertical walls between adjacent cells. The gap or width of the grooves 27 between adjacent cells within any zone is sufficient to permit a uniform distribution of air among all the cells of a zone and permits a shifting of air from cell to cell as a sleeper shifts his position on the mattress. The vertical walls of the grooves 27 prevent collapse of the grooves as a sleeper shifts on the mattress.

Each pocket 28 is approximately four inches deep so that each cell 35 is about eight inches in height. Each square is about five inches across opposed sides. The square cells, when inflated, have semi-spherical ends which may be drawn with a minimum thinning of the wall thickness.

The mattress 25 is divided into fire zones. Zone 1, formed by two rows a and b and indicated at 41, is a head zone which extends from the upper end of the bed to about the neck area of a person reclining atop the bed. Zone 2, formed by rows c-e and indicated at 42, is a shoulder zone which underlies the shoulder area from the waist to the neck of the person reclining atop the sleeper. Zone 3, formed by a single row f and indicated at 43, is a waist zone which underlies the waist of a person reclining atop the mattress. Zone 4 formed by rows g, h, i and j and indicated at 44 is a hip zone which receives the hips and pelvic area of a person reclining atop the mattress. The fifth and last zone, Zone 5, formed by rows k-o and indicated at 45, is a foot zone which receives the legs and feet of the person reclining atop the sleeper. Four continuous transverse seals 46 close the gaps between adjoining cells and thus divide the mattress into the five zones 41–45.

Each zone 41–45 has an air connection or hose, indicated at 50, which connects the zone to the air supply pump and housing 90. This source of pressurized air supplies air to each of the zones to maintain those zones at predetermined pressure levels. When the pressure in a zone is too high, a pressure regulator $R_1$–$R_4$ (FIG. 6) operatively associated with the zone through the connecting hose 50 opens to permit air to bleed out of the zone to atmosphere. When air pressure is too low, the pressure regulator associated with the zone opens to connect the air pump to the hose 50 associated with that zone so as to introduce air into the zone. Each zone, the respective rows and cells comprising it, and the preferred air pressure in it, are set forth in the chart below.

| Zone | Body Section | Rows | Water Pressure | Pressure Hg |
|---|---|---|---|---|
| 1 | head | a,b | 4″ $H_2O$ | 7.5 mm Hg |
| 2 | shoulder | c–e | 6″ $H_2O$ | 11.2 mm Hg |
| 3 | waist | f | 11″ $H_2O$ | 20.5 mm Hg |
| 4 | hip | g–j | 8″ $H_2O$ | 14.9 mm Hg |
| 5 | foot | k–o | 4″ $H_2O$ | 7.5 mm HG |

By combining Zones 1 and 5, the head and foot zones, a minimum of four different pressures can be employed in the five zones. To that end, the head and foot zones are connected to a common pressure regulator $R_1$.

When a person reclines on the top of the mattress 25, the body weight causes the air pressure in the zones to increase. The respective pressure regulators $R_1$ to $R_4$ then operate to bleed air from the respective zones to atmosphere until such time as the zone pressures reach the pressure settings of the regulators. When the person leaves the mattress, the air in the respective zones falls. The pressure regulators $R_1$ to $R_4$ connected to each zone will permit air to flow into the zones until such time as the zone pressures are once again established.

The mattress is encased within a cover 30 which includes a top pad 65 and a denim covering material 66. The top pad comprises two plies 68, 69 of woven, eight-way stretch fabric between which there is sandwiched a non-woven, crimped batting 70. The batting is preferably formed of crimped polyester fibers and in its uncompressed condition, is approximately one-inch thick. The woven, eight-way stretch fabric allows shoulders or any other body prominences to penetrate into the mattress and not be restrained by the material so as to have a minimal effect on maintaining ischemic pressures against the body prominences. The batting 70 functions to permit the free flow of air between the body and the top of the vinyl mattress. The batting is encased between the two plies of eight-way stretch fabric 68, 69, which is in turn sewn together at the edge as indicated at 71. This edge is also sewn to the denim covering material 66 which surrounds the sides and bottom of the mattress. There is preferably a zipper, as indicated at 72, for connecting the top and bottom sections of the denim covering so as to facilitate removal, replacement or cleaning of the pad 65 or the complete cover 30, whenever that should become desirable.

The method of forming the mattress 25 is illustrated in FIG. 5. As mentioned hereinabove, the mattress is made in three separate sections of five rows each. The sections are not identical, though, because the seals between adjacent zones within the mattress sections differ. For example, in the mattress section 25a which comprises the foot zone 5, there are no transverse seals 46 between the five rows. The middle section 25b has one transverse seal 46 extending the length of the row and located between one endmost row and the next adjacent row, i.e., between rows f and g of the overall mattress. The third mattress section 25c has a single transverse seal 46 extending the length of the row between rows b and c. In accordance with the practice of this invention, all three sections may be manufactured utilizing a single die or forming tool 75. This tool 75 is illustrated in FIG. 5. It has a plurality of pockets 76 for forming the pockets 28 in the mattress. In the preferred embodiment of the tool, it has 35 pockets 76 arranged in 5 rows of 7 pockets each. The bottom wall 77 of the tool is foraminous as is conventional in vacuum forming machinery such that a vacuum may be drawn through the bottom wall. The side walls 78 of each pocket 76 terminate in an upper flat or planar section 79 of the die. At the intersection of the pockets 76, this upper planar section 79 is recessed as indicated at 80 to form a recessed intersection at every intersection except at the outer sides of the die. In the use of the forming tool 75, inserts are placed in these recesses 80. These inserts 81, 82 take one of two forms. They may either be shaped as a star so as to fit within the recess 80 but with a pair of parallel, rectangular-shaped channels 81a formed in the top surface thereof, or they may have the same outer configuration and have a pair of intersecting rectangular-shaped passages 82a and 82b formed therein. If an insert, such as the insert 81, is placed in one of the recesses 80 and the tool then used to form one half of a mattress section, as explained more fully hereinafter, the passages 81a in the insert 81 form parallel airflow passages in the formed half of the mattress. This insert is used at a site where a continuous seal 46 is located. Alternatively, if an insert, such as the insert 82, is located in the recess 80 of the dies and the tool used to form one half of the mattress, the resulting formed half of the mattress section has intersecting passageways formed therein so as to form a four-way airflow passage between all four pockets formed at this intersection.

In the forming of the pockets, the sheet of vinyl is laid across the tool and is heated by conventional apparatus until it becomes formable. The vacuum is then applied to stretch the material and draw it into the pockets 76 of the forming tool 75. In the course of drawing the vinyl into the mold, the vinyl is drawn into the rectangular-shaped grooves or channels 81a of the insert 81 or the rectangular-shaped channels 82a, 82b of the insert 82. Thereby, the airflow passages 27 (FIGS. 3A and 3B) between adjacent pockets are formed. After formation of two identical sheets of vinyl within the forming tool, the two sheets are placed one atop the other with the pockets opposed. An electronic sealing die is then applied to the juxtapositioned sheets so as to form seals 29, 46 between the pockets approximately ¼ inch in width.

The seals 29 are not formed at the location of the channels 81a, 82a and 82b between adjacent cells or pockets so that those channels remain open to form grooves or flow paths 27 for air between the adjacent pockets.

In the use of the mattress 25, the mattress is inflated approximately to the pressure referred to in the chart hereinabove. The person reclining atop the mattress positions their waist to overlie the sixth row f of cells. This row, which occupies the waist zone, is inflated to a pressure greater than that of the other zones. Thereby, the waist of a person reclining atop the mattress is retained in a relatively elevated position for good spinal alignment, as well as total body alignment, of the person reclining atop the mattress from head to toe. By spinal alignment, it is meant that alignment of the spine which the spine maintains when that same person is standing in a relaxed attitude with their feet approximately 12 inches apart. The mattress of this invention is operative to maintain that spinal alignment while the person reclines either on their side or on their back atop of the mattress. The normalized pressures in the zones maintain those zones in a condition so as to achieve this spinal alignment. As the person reclines on either their side or back, and as the person reclining atop the mattress moves or shifts their position atop the mattress, the mattress is operative, via the air pump and flow control 15, to readjust the pressure so as to maintain the pressure set forth hereinabove within those zones.

As the sleeper rolls from one position on the bed to another, the air from the cells shifts to bleed air from the newly occupied cells into the cells previously occupied. The air may also pass to or from the regulator valves $R_1$ to $R_4$. In order that body movement may be easy to achieve yet dampened in its action, both the size and shape of the grooves 27 between adjoining cells and the flow rate through the regulator valves $R_1$ to $R_4$ are critical to the performance of the bed.

AIR PUMP AND AIRFLOW CONTROL SYSTEM

The air pressure within each of the cells is controlled by the air pump and airflow control system 15 contained within the housing 90. As a consequence of the construction of the pump and flow control 15, there is only an electrical cord 91 and four air supply lines extending from the housing 90. The air pressure regulators $R_1$–$R_4$ for controlling the pressure in each of the five zones of the mattress, as well as the pump for supplying pressurized air to the pressure regulators, and the surge check valves $CV_1$–$CV_4$ are all contained within this housing 90. Additionally, this housing 90 contains the electric motor for driving the pump, as well as the solenoids and timers for controlling airflow from the pump to the mattress as described hereinbelow. This pump and control circuit is schematically illustrated in FIG. 6 and is physically illustrated in FIG. 9.

Figure 6:
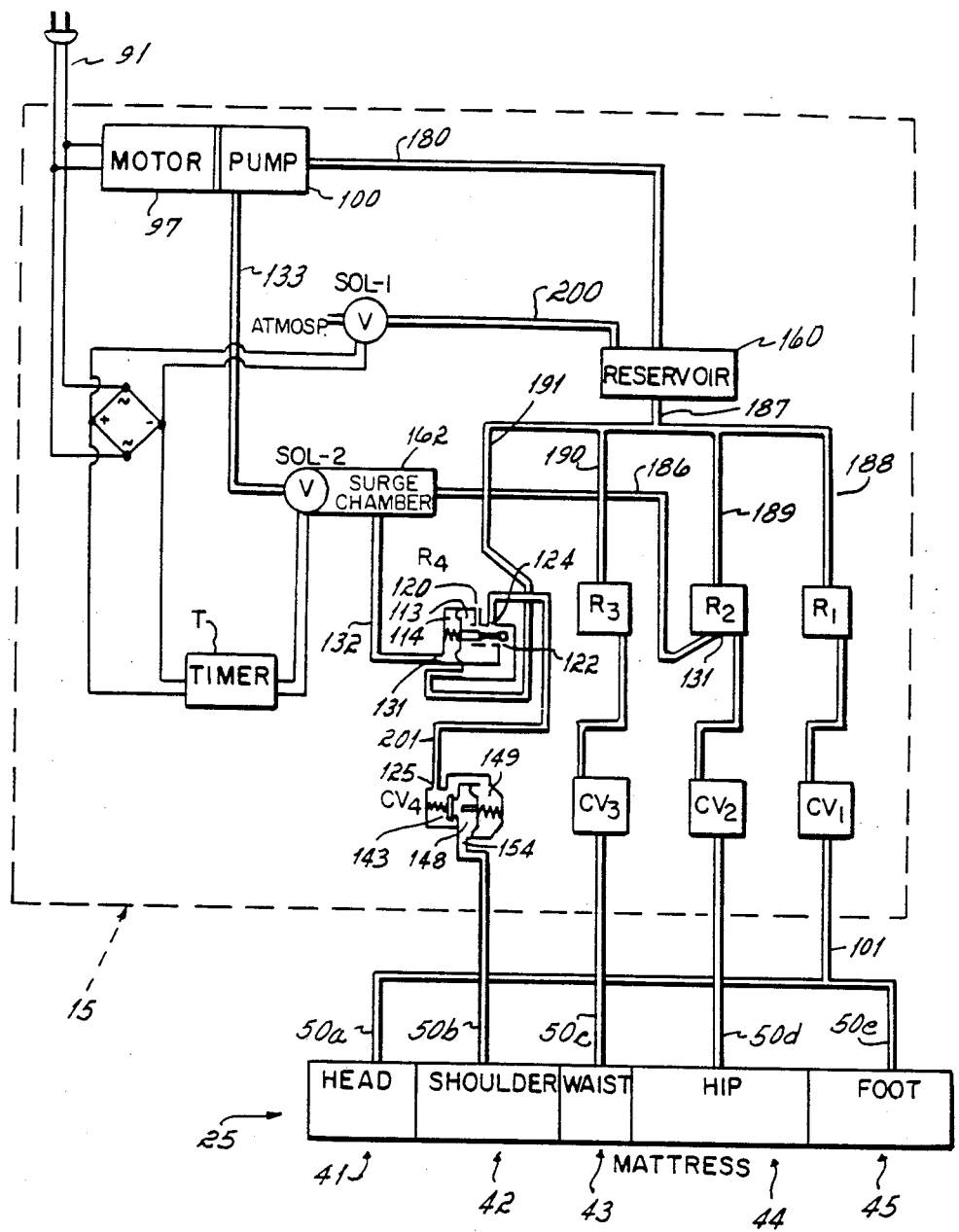
FIG. 6 is a partially diagrammatic illustration of the airflow control system utilized in the air bed of FIG. 1.

The airflow control system for supplying air from the air supply pump to the mattress 25 via the air supply lines or conduits 50a, 50b, 50c, 50d and 50e is diagrammatically illustrated in FIG. 6. As there illustrated, this system includes a constantly driven electric motor 97 for driving a reciprocating piston pump 100. This pump is operative to supply air to the zones 41–45 of the mattress via the air lines 50a–50e. Between the pump and each zone there is a pressure regulator $R_1$–$R_4$ for maintaining the pressures set forth in the chart hereinabove in each of the zones. The pressure regulator $R_1$ supplies air at the desired and preset pressure to both the foot and head zones 45, 41 as a consequence of the two air lines 50a, 50e to those zones being interconnected via a common line 101.

Between each pressure regulator for supplying air at the preset pressure to the zones and the air lines to that zone, there is a surge check valve $CV_1$–$CV_4$. The function of these check valves, as explained more fully hereinbelow, is to prevent air from being bled off of any zone in the event that an excessively high pressure is applied to that zone. Such excessively high pressures are applied, for example, whenever a person sits on the edge of the bed, or sits up in bed, as for example, to watch TV on the bed, or even if two persons applied their weight to the same zone. In that event and in the absence of the surge check valves $CV_1$–$CV_4$, the air in any one zone could be bled off so as to bottom the mattress in that zone. As explained more fully hereinafter, the connection and the construction of the surge check valves is such that those valves close and prevent any bleeding of air from the zone in the event that the air pressure in a particular zone exceeds some multiple, as for example, 1.7, of the preset pressure at which the regulator $R_1$–$R_4$ is set to bleed pressure from that zone.

In addition to the electric motor driven pump 100, the pressure regulators $R_1$–$R_4$ and the surge check valves $CV_a$–$CV_4$, the airflow control system 15 contained within the housing 90 includes two solenoid operated valves, SOL-1 and SOL-2, operable between the pump and the pressure regulators $R_1$–$R_4$. Additionally, the system 15 includes a timer T operable to control electrical actuation of the solenoid SOL-2. The first solenoid, SOL-1, functions to prevent the flow of air from the zones 41–45 of the mattress 25 whenever there is a loss of electrical power to the system. The second solenoid SOL-2 cooperates with the timer and with the pressure regulators to periodically and regularly supply a high pressure pulse of air or boost to the shoulder and hip zones of the mattress so as to prevent a person reclining atop the bed from slowly sinking into the mattress below the normalized position over a long period of time, as for example, over the course of a complete night's sleep. Sometimes it is found that the sleeper sinks further into the bed than the normalized position. The purpose of the boost system is to lift the sleeper back to the normalized position. To achieve this operational characteristic, the airflow control system of FIG. 6 periodically operates to inject a pulse of air into the shoulder zone 42 and the hip zone 44 of the mattress. This pressure pulse, which may be on for a period of six seconds, followed by sixty seconds off, is not so great when applied to the volume of the full zones as to increase the measured pressures in the zones to a level such that a person reclining upon the mattress feels the pressure increase, but it is sufficient to return a person to the normalized height of the mattress after sinking below that height.

AIR PRESSURE REGULATOR

Figure 7:
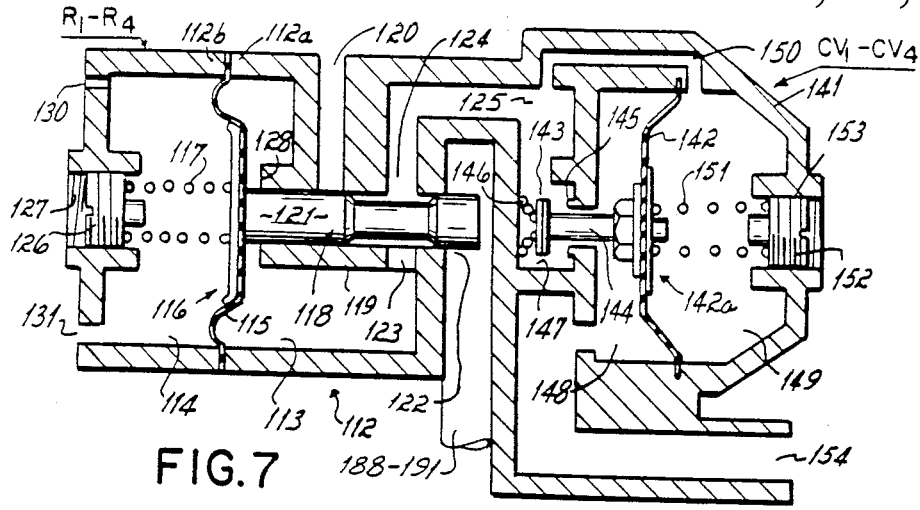
FIG. 7 is a cross-sectional view of a pressure regulator and surge check valve used in the airflow control system of FIG. 6.

Except for a pulsing air connection 131 to $R_2$ and $R_4$, the air pressure regulators $R_1$–$R_4$ are all identical and are illustrated in detail in FIG. 7. Each is a diaphragm-type pressure regulator operative to maintain relatively low air pressures in the air mattress within narrow parameters as air is bled off of a zone or supplied to it. Each regulator $R_1$–$R_4$ comprises a housing 112 divided into upper and lower chambers 113, 114 (right side and left side, respectively, in FIGS. 7 and 8) by a flexible diaphragm 115. The diaphragm 115 is clamped at its outer periphery between two sections 112a, 112b of the housing which defines the upper and lower chambers of the regulator. The inner portion of the diaphragm 115 is secured to a rigid piston 116 movable internally of the regulator housing 112. The piston 116 is in turn connected to a piston rod 118 movable within a cylinder 119 contained internally of the upper chamber 113. This cylinder has one outlet passage 120 open to the exterior of the housing and a second outlet passage 123 open to the interior of the upper chamber 113. The piston rod 118 is stepped such that an enlarged diameter section 121 of the piston rod is movable over the passage 120 to either block it in the position illustrated in FIG. 7 or unblock it if the piston 116 is moved into the lower chamber 114 from the position illustrated in FIG. 7. When unblocked by the enlarged section 121 of the piston rod 118, the passage 120 connects a pump air line inlet 122 of the pressure regulator to atmosphere. The second passage 123 through the cylinder connects the pressure regulator inlet 122 from the pump to the upper chamber 113 of the regulator. The upper chamber 113 of the pressure regulator has an outlet port 124 connected via a port 125 to the appropriate one of the surge check valves $CV_1$–$Cv_4$.

The lower chamber 114 of the pressure regulator contains a compression spring 117 which extends between an adjustable screw 126 mounted in a threaded bore 127 of the regulator and the piston 116. The screw 126 may be threaded into and out of the housing to control the force with which the piston 116 is biased against the end 128 of the cylinder 119. Adjustment of this screw, and thus of the spring pressure applied to the piston 116, determines the force required in the chamber 113, and thus the air pressure in the zone of the mattress to which the regulator is connected to move the piston 116. A pressure in chamber 113, which exerts less force on piston 116 than the force of the spring 117, causes the enlarged section 121 of piston 118 to close off exhaust port 120. Pressure through air inlet 122 then flows around piston 118 and exhausts through the outlet port 124 to the surge check valve $CV_1$–$CV_4$ and on to the mattress zone.

A pressure in chamber 113 which exerts more force on piston 116 than the force of the spring 117 causes the enlarged section 121 of piston 118 to open exhaust port 120 and port 124 to be sealed off by the lower enlarged section of piston 118. Pressure through air inlet 122 then flows around piston 118 and exhausts through exhaust port 120 while pressure in the mattress zone is effectively sealed off by the closed outlet port at 124.

In order to permit the piston 116 to move within the lower chamber 114, that chamber is normally maintained at atmospheric pressure via a small air leakage passage 130 which passes through the casing 112b.

In the preferred system, it has been found adequate and desirable to periodically apply a pressure pulse of air to the shoulder zone and the hip zone of the mattress. In order to periodically pulse these zones of the mattress with high pressure air, the pressure regulators of these two zones are provided with a port 131 which connects the lower chamber 114 of the pressure regulators ($R_2$ and $R_4$) to the solenoid valve SOL-2 via an air supply line 132. The solenoid valve SOL-2 enables the line 132 to, whenever the solenoid 129 of the valve SOL-2 is energized, connect the lower chamber 114 of the regulator to the pump supply line 133 via a surge chamber 162. When the solenoid 129 of the valve SOL-2 is energized, high pressure air at pump pressure is connected to the lower chamber 114 of the pressure regulator which, with the assistance of the spring 117, will overcome the pressure in chamber 113. When this pressure is supplied to the lower chamber 114 via the solenoid valve SOL-2, it results in the piston 116 being moved to the position illustrated in FIG. 7 wherein air pressure from the pump at pump pressure is supplied through the air passage 122 and the upper chamber 113 to the air passage 124 and the mattress. The solenoid 129 of the valve SOL-2 is controlled by a timer T. This timer is operative to cycle energization of the solenoid 129 of the valve SOL-2 through an on cycle of from 1-15 seconds and an off cycle of from 30-180 seconds. In one preferred embodiment, the timer cycles the solenoid 129 through an on or energized cycle of 6 seconds and an off or deenergized cycle of 60 seconds. With this timing and utilizing a pump 100 which has a pressure capacity of 51 inches of water pressure and a flow rate of 20 liters per minute of air at atmospheric pressure, the surge pressure in any one zone of the mattress never is maintained for sufficient time that a person reclining atop the mattress can feel the pressure surge. This pressure and airflow, though, is sufficient to return even a very heavy person to the normalized height of the mattress after that person has rolled and tossed atop the mattress and forced air from the zones of the mattress.

SURGE CHECK VALVE

Located in the airflow path between the outlet 124 of each pressure regulator and the air conduit 50 to each zone 41-45 of the mattress, there is one of the surge check valves $CV_1$-$CV_4$. These surge check valves function to close and prevent the egress of air from any zone of the mattress whenever the pressure in a zone exceeds by a predetermined multiple, as for example, 1.7, the normalized pressure preestablished by the regulator to be maintained in that zone. Such high pressure within the zone would occur, for example, if the person stood on the mattress or kneeled on the mattress or sat on the mattress. If a person remained standing or sitting on the mattress for a long enough time and in the absence of the surge check valve $CV_1$-$CV_4$, the mattress would eventually flatten or bottom out in that zone. The surge check valves $CV_1$-$CV_4$, in response to that high pressure, close and prevent the egress of air from any zone so long as the pressure in the zone exceeds by a preset multiple the preset or predetermined normalized pressure established by the pressure regulator for that zone. In the preferred embodiment, the multiple is between 1.3 and 2.0 times the preset pressure, depending upon the applied zone.

Figure 8:
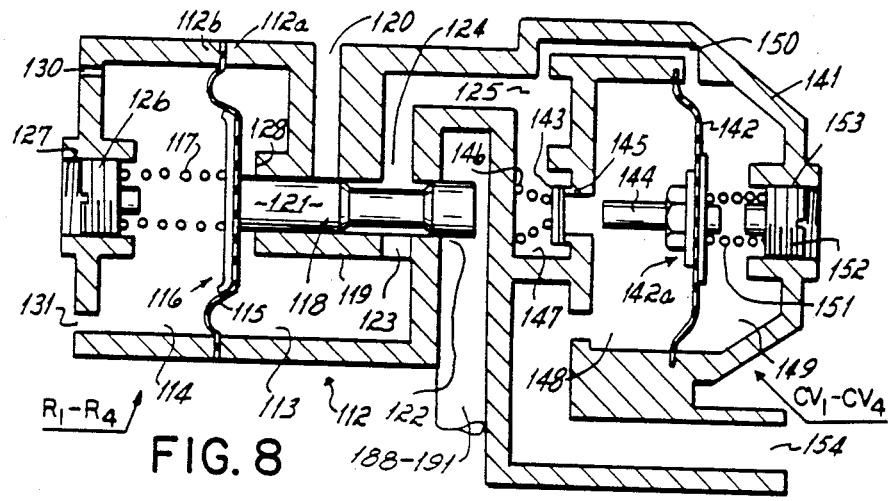
FIG. 8 is a cross-sectional view similar to FIG. 7 but illustrating the surge check valve in the closed position of the valve.

The surge check valves $CV_1$-$CV_4$ are all identical. A typical surge check valve $CV_1$-$CV_4$ is illustrated in FIGS. 7 and 8. This surge check valve comprises a housing 141 within which is a diaphragm 142 and a close valve 143. The diaphragm 142 is secured at its periphery to the housing and is secured at the center to a piston 142a of a piston rod 144. This piston rod 144 extends downwardly or to the left as viewed in FIGS. 7 and 8 from the piston 142a. The close valve 143 comprises a flat, round plate with segments machined out of the periphery of the plate to allow a controlled flow of air and a flat, circular butile rubber insert fixed to the face of the plate and able to seal on a circular abutment 145 of the housing 141. A compression spring 146 exerts an upward force on the close valve plate 143. A second compression spring 151 exerts a downward force on piston 142a which, via piston rod 144, normally exerts a greater downward force on plate 143. The close valve therefore normally remains open.

A screw 152 is threaded into housing 141 at 153 and may be screwed in and out of the thread 153 to adjust the compression of spring 151.

Each surge check valve $CV_1$-$CV_4$ has three chambers. A lower chamber 147, a central (sensing) chamber 148 and an upper chamber 149. During normal pumping or idling conditions, pump pressure at port 125 is sensed in chamber 147, close valve 143 is open, pump pressure is sensed in chamber 148 and chamber 149 via channel 150, and the flow from and to the regulator valve passes via port 125 and the chambers 147 and 148 to the mattress zone via connector 154.

A surge pressure resulting from a sudden, increased load on the mattress is sensed in chamber 148. This pressure will diminish rapidly as flow passes through cutout segments of close valve plate 143, and the pressure in chambers 147 and 149 will be significantly less than the surge pressure in chamber 148. This surge pressure in chamber 148, acting on piston 142a, causes diaphragm 142 to move into chamber 149 and compress spring 151. The piston rod 144 then loses contact with plate 143, and the compression spring 146 then causes the rubber seal in 143 to close on the abutment 145. The valve then seals and prevents flow from the mattress zone. An increase of the surge pressure sensed in chamber 148 will further compress spring 151 while the seal at 145 will be maintained by the compression spring 146. Any increase of pressure in chamber 148 beyond the safety limit of compression spring 146 will cause the close plate 143 to open, and high pressure air will pass through 145 and evacuate to atmosphere via 124, 118 and 120.

The screw 152 is normally adjusted in the threaded portion 153 of housing 141 to permit spring 151 to exert sufficient upthrust on plate 143 such that a surge pressure of between 1.3 and 2.0 times the normalized zone pressure will close the valve.

FIG. 8 illustrates the close valve 147 in the surge or closed condition.

When the surge pressure is relieved, the pressure in chamber 148 ceases to be sufficient to compress spring 151, and the piston 142a moves upwards, causing piston rod 144 to contact close valve plate 143 and open the seat at 145. The close valve then reverts to its open position illustrated in FIG. 7.

AIR PUMP AND AIRFLOW CONTROL SYSTEM HOUSING

Figure 9:
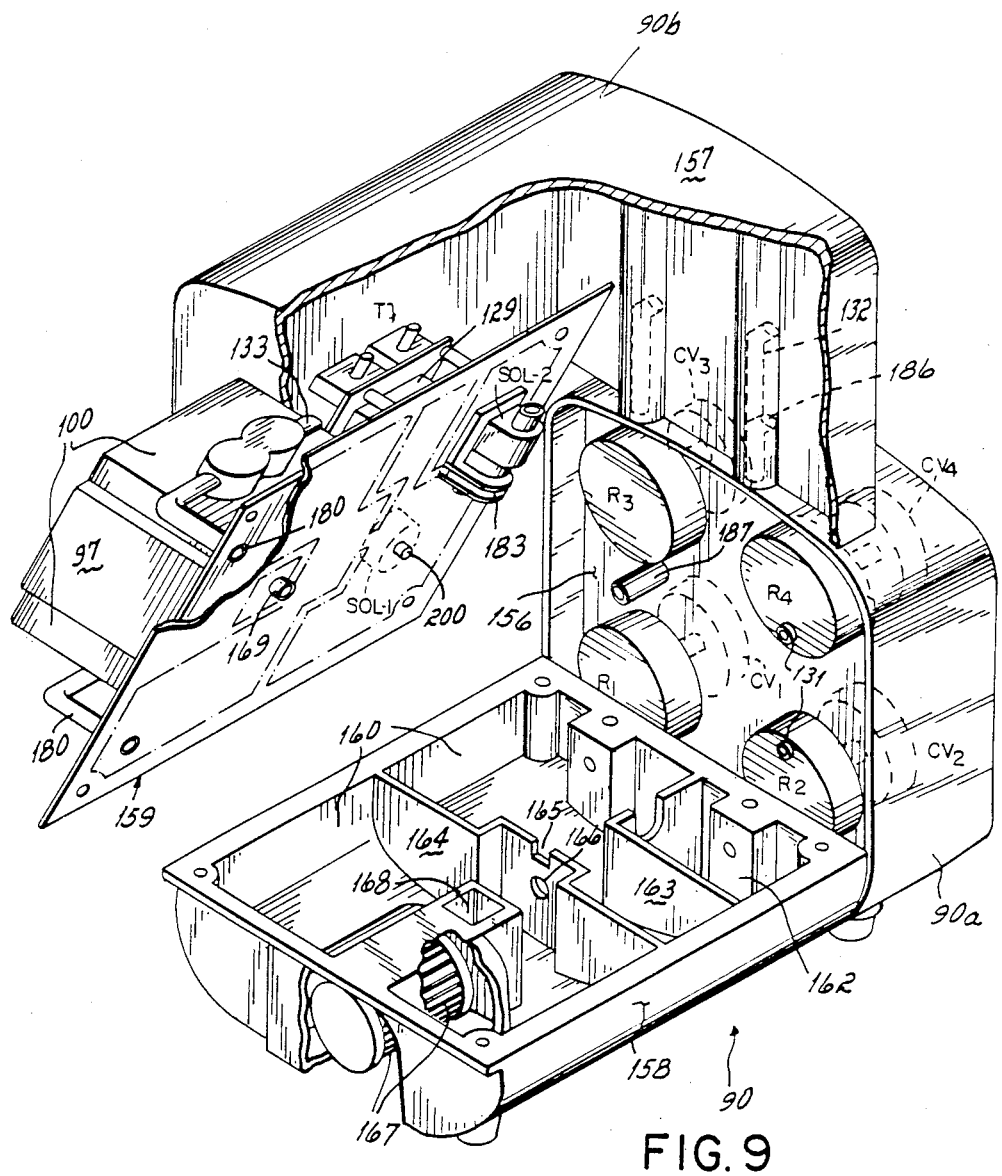
FIG. 9 is an exploded perspective view of the novel air pump and airflow control system housing of the invention.

The air pump and airflow control system housing 90 (FIG. 1) is illustrated in an exploded perspective view in FIG. 9. The pump housing 90 encases all of the structure illustrated diagrammatically in FIG. 6 except for the air lines 50 and 101. Those are the air lines which extend between the pump housing 90 and the mattress 25. Specifically, the housing 90 contains the reciprocating diaphragm pump 100, as well as the electric motor 97 for driving that pump. It also contains the four pressure regulators $R_1$-$R_4$, as well as the surge check valves $CV_1$-$CV_4$ associated with those pressure regulators. The housing further contains or houses the two solenoid valves SOL-1, SOL-2, their respective solenoids and the timer T. These components are all interconnected in the manner illustrated in FIG. 6 via chambers, air lines, airflow passages and ports contained within the housing.

The housing 90 is divided by a wall 156 into a front section 90a and a rear section 90b. The front section 90a houses the pressure regulators $R_1$-$R_4$, as well as the surge check valves $CV_1$-$CV_4$ associated with those pressure regulators. The front section also houses the air lines which interconnect those surge check valves and pressure regulators in the manner illustrated in FIG. 6. The rear section 90b of the housing 90 is divided into upper and lower sections 157, 158, each section of which is formed by a separate die casting. The two sections are divided or sealingly separated by a mounting plate 159, which plate is sealingly sandwiched between the two sections 157, 158 when the two sections are assembled and secured together by screws (not shown) which pass through corner holes in the lower section 158 of the housing and the mounting plate 159 and are threaded into mating holes (not shown) of the upper section 157 of the housing. The upper section 157 houses the pump 100, as well as the electric motor 97 for driving that pump, both of which are mounted upon the top of the mounting plate 159. The upper section 157 also houses the two solenoid valves SOL-1 and SOL-2 and the timer T (not shown in FIG. 9), all of which are also mounted upon the top of the mounting plate 159. The lower section 158 of the housing 90 is divided into two chambers, a main pressure reservoir chamber 160 and a surge pressure chamber 162. The two chambers 160, 162 are sealingly separated by a wall 163 of the lower section 158 of the housing. For purposes of reinforcing the lower section of the housing and better supporting the mounting plate, there is a divider wall 164 which is upstanding from the bottom wall of the lower section 158 of the housing. This divider wall, though, has air passageways 165, 166 formed therein through which air may freely pass between opposite sides of the divider wall 164 without any pressure differential on opposite sides of the divider wall 164.

Mounted on the rear side of the lower section 158 of the housing 90 there is an air filter and muffler 167. This filter and muffler combination is operative to filter air before it enters the pump. The filter also acts as a muffler to quiet operation of the pump and control system. Air passing through the filter flows through a passage 168 formed in the lower section 158 of the housing upwardly through an air intake line 169 into the pump 100.

OPERATION OF AIRFLOW CONTROL SYSTEM

The operation of the airflow control system 15 utilized to inflate and maintain the air pressure in all of the zones of the mattress 25 while a person is reclining on the mattress is best explained with reference to FIGS. 6-9. With references to these Figures, it will be seen that the mattress is initially inflated by electrically energizing the motor 97 which drives the pump 100 and solenoid SOL-1 to seal off reservoir 160. Energization of this continuously operable motor and solenoid results in the pump 100 taking air in through the filter and muffler 167 via line 168 and dispensing it from the pump via the two lines 180, 133. Line 180 is operative to supply air to the pressure reservoir chamber 160 while the line 133 supplies the air to the solenoid valve SOL-2. The solenoid valve SOL-2 in turn, when open, supplies the air from the pump through a sealed fitting 183 into the surge pressure chamber 162 (FIG. 9). From the surge pressure chamber 162 the air at full pump pressure is supplied via lines 132 and 186 to the intake ports 131 of the pressure regulators $R_2$ and $R_4$, respectively. The air from the pump to the main pressure reservoir chamber 160 is supplied from that reservoir to an air line 187, which in turn distributes it via passages 188, 189, 190 and 191 internally of the pump housing to the air intake ports 122 (FIG. 6) of the pressure regulators $R_1$-$R_4$, respectively. So long as the pressure in each of the zones or any one of them is less than the preset pressure determined for that zone by the setting of the spring 117 in the pressure regulator, air will flow through the pressure regulator to the surge check valve $CV_1$-$CV_4$ associated with the pressure regulator. This flow through the regulator occurs via inlet port 122 (FIG. 7), passage 123 into upper chamber 113, and thence via the outlet fitting 124 to the surge check valve $CV_1$-$CV_4$ The air then flows through the surge check valve via inlet port 125, past open valve seat 143, to the outlet port or fitting 154 and thence to the mattress zone.

When the zone with which any pressure regulator is associated reaches the pressure setting determined by the springs 117 of the pressure regulator, i.e., 4 inches $H_2O$ in the foot zone, 8 inches $H_2O$ in the hip zones, 11 inches $H_2O$ in the waist zone, 6 inches $H_2O$ in the shoulder zones, 4 inches $H_2O$ in the head zone, the pressure in the upper chamber 113 of the pressure regulator associated with that zone will be sufficient to overcome the spring pressure in the lower chamber 114 so as to force the piston 116 downwardly to a position wherein the inlet port 122 of the regulator is closed. This closing of the port 122 internally of the pressure regulator prevents air from entering the upper chamber from the inlet port 122 so that the pressure then obtaining in the zone with which that regulator is connected is maintained.

When all of the zones of the mattress are fully inflated to the normalized pressures determined by the regulators $R_1$-$R_4$, the reciprocating diaphragm pump 100 will continue to operate with a resulting pressure buildup in the lines 188-191 to the pressure regulators. This buildup in pressure to the pressure regulators causes the piston rods 118 to move downwardly and uncover the exhaust ports 120 such that there is leakage airflow through the regulators via the exhaust ports 120 so long as the zones of the mattress are all at the preset normalized pressures of the regulator valves. The pressure buildup to the pressure regulators also causes the volume of air delivered by the pump to be reduced. The leakage airflow just balances the flow from the pump without causing any changes of pressure in the zones of the mattress to which the regulators supply air.

When a person reclines on the mattress, that person displaces air from each of the zones until the pressure in those zones with the person reclining atop the mattress is at the preset pressure settings of the regulators $R_1$-$R_4$. Thus, when the person reclines atop the mattress, air is forced from the zone through the pressure regulator associated with that zone. This flow from the mattress zone occurs through the upper chamber 148 of the open surge check valve $CV_1$-$CV_4$ to the upper chamber 113 of the air regulator. This high pressure causes the piston 116 of the pressure regulator to move downwardly and overcome the force of the spring 117. This downward movement of the piston continues until the port 122 of the regulator is connected to the exhaust port 120 via the recessed neck section 118a of the piston rod. In this position of the piston and piston rod, air leaks or bleeds from the mattress through the pressure regulator to the atmosphere. This leakage or bleeding of air from the mattress will occur through the upper chamber of the pressure regulator until the pressure in the zone with which the regulator is associated returns to its preset level, at which level the spring 117 will overcome the air pressure in the chamber 113 so as to raise the piston and piston rod until the exhaust port 120 is blocked by the piston rod 118.

While the mattress is inflating, and after full inflation of the mattress zone, the timer T will periodically be actuated, as for example, for 6 seconds of a 66-second total cycle. When the timer is actuated or on, it causes the solenoid valve SOL-2 to open, thereby permitting air to flow at pump pressure from line 133, through the surge pressure chamber 162 and lines 132, 186, to the lower pressure chamber 114 of the pressure regulators $R_2$ and $R_4$. This air from the pump flowing through the solenoid valve SOL-2 is at full pump pressure, a pressure sufficient to overcome the springs 117 of the pressure regulators and thereby lift the diaphragm pistons 116 of these valves to a position whereat the regulator valve is open between the inlet port 122 and the outlet port 124 irrespective of the pressure in the mattress zone with which the regulator is associated. For so long as the solenoid valve SOL-2 remains open, this air at pump pressure will be supplied to the hip and shoulder zones of the mattress. When the solenoid closes, as determined by the timer T, high pressure air in the lower chamber of the regulator bleeds to atmosphere via the small leakage port 130 in the housing 112b. Any overpressure of the hip and shoulder zones which occurred while the solenoid valve SOL-2 was energized is then allowed to flow from that zone back through the pressure regulator as a consequence of that overpressure being applied to the upper chamber 113 of the pressure regulator and forcing the piston 116 of the regulator downwardly to such an extent as to connect the mattress zone to atmosphere via passage 124, piston 118 and the exhaust port 120 of the regulator.

There may be occasions when there is a loss of electrical power to the pump. In that event, the airflow control system of this invention could operate to permit the bleeding off of air from the mattress via the pressure regulator, but there would be no pump pressure or airflow to replenish that air. Eventually, the mattress could lose substantially all of its air pressure. To prevent that from happening, the airflow control system of this invention includes the solenoid valve SOL-1, which is normally closed when the solenoid is energized and opens when there is a loss of power and the solenoid is deenergized. As may be seen in FIG. 6, the loss of electrical power from the source is operative to deenergize solenoid valve SOL-1 and thereby open the air reservoir 160 to atmospheric pressure via the airflow line 200. When the pressure in the reservoir 160 drops to atmospheric pressure, there is airflow from the upper chamber 113 of the pressure regulator through the line 180, the line 200 and the solenoid valve SOL-1. This loss of air pressure through the solenoid SOL-1 is transmitted through the pressure regulator and line 125 to the pressure chambers 147 and 149 of the surge check valve. The air pressure in the mattress acting on the opposite end chamber 148 of the surge check valve causes the piston 142a and diaphragm 142 to move down into chamber 149 and the piston rod 144 to lose contact with the valve plate 143. Compression spring 146 will immediately cause the rubber seal in valve plate 143 to seal on the abutment 145, and the seal will close to prevent airflow from the mattress zone. Consequently, the loss of electrical power to the pump and to the solenoid valve SOL-1, which is electrically connected in parallel with the pump, results in the surge check valves $CV_1$-$CV_4$ all closing and remaining closed until such time as the pump is reenergized and moves air through the pressure regulators to the large end chambers 147 and 149 of the surge check valves $CV_1$-$CV_4$.

ADJUSTABLE FIRMNESS AIR BED

Figure 11:
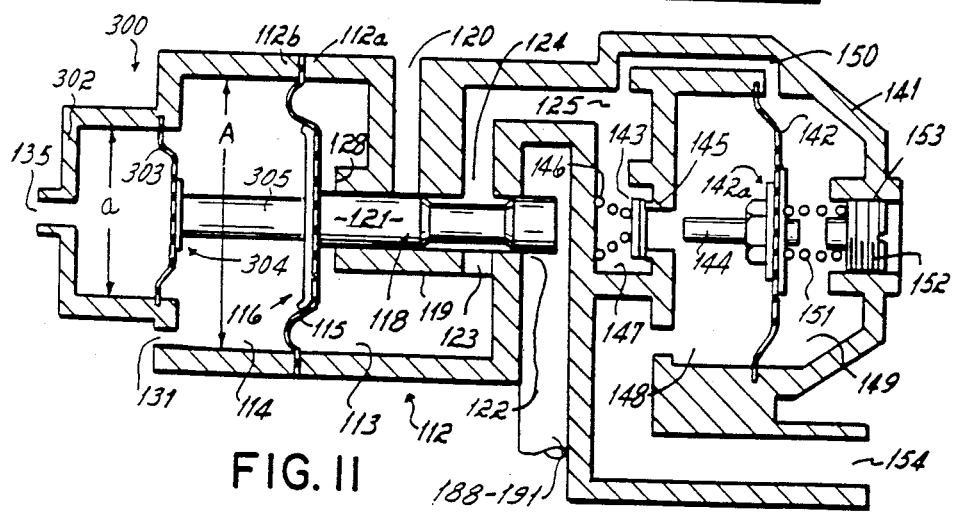
FIG. 11 is a cross-sectional view of a modified pressure regulator utilized in the air control system of FIG. 10.
Figure 10:
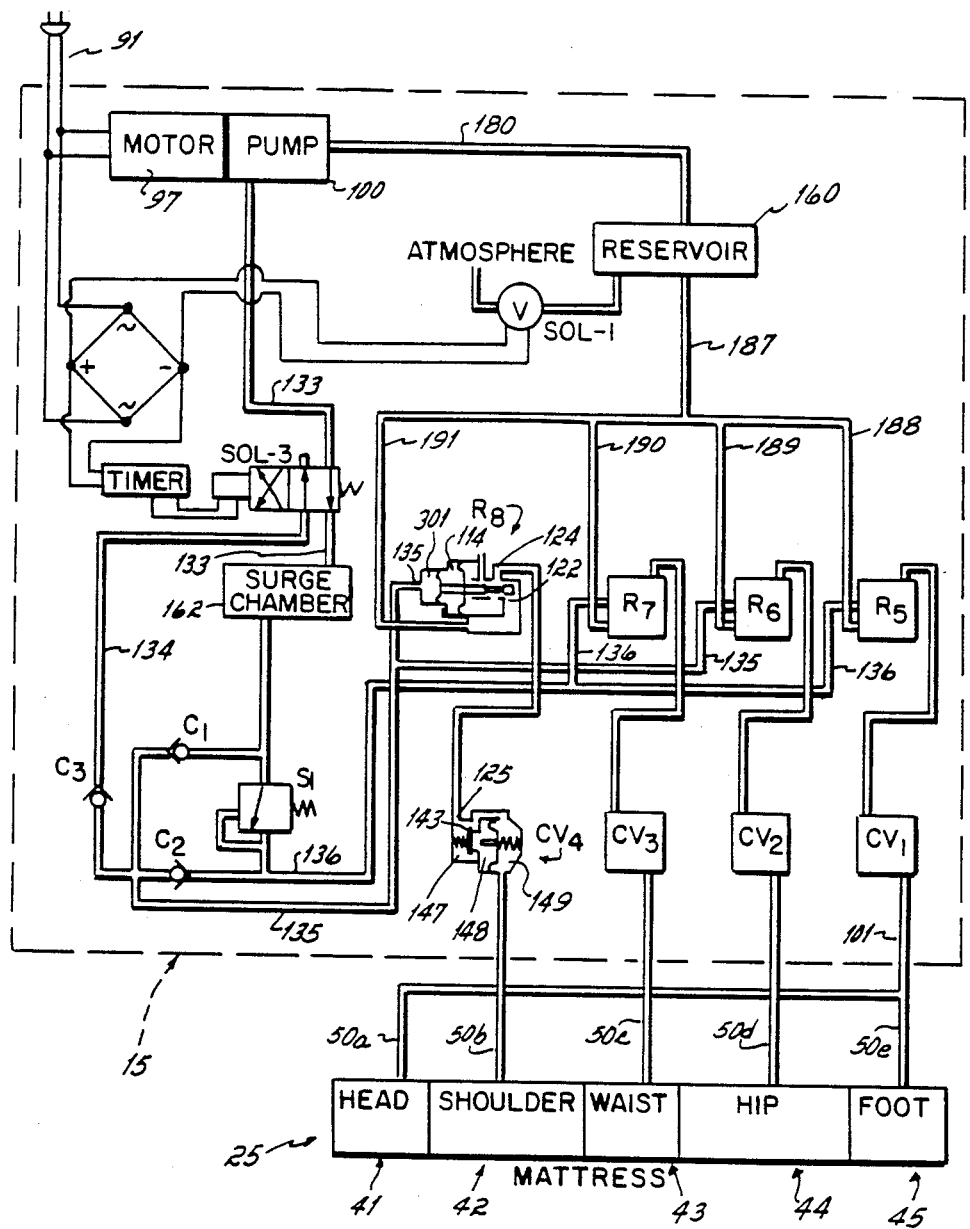
FIG. 10 is a partially diagrammatic illustration of a modified airflow control system operable to achieve adjustable firmness of the air mattress.

With reference now to FIGS. 10 and 11, there is illustrated a second embodiment of this invention which differs from the first embodiment of FIGS. 1-9 only in that it adds to the embodiment of FIGS. 1-9 of the air bed the capability of regulating or adjusting the firmness of the mattress. This is accomplished while maintaining the same relative pressures in each of the zones of the mattress, but with those pressures either increased for additional firmness or decreased for less firmness. Structurally, the only difference between the air bed embodiment of FIGS. 1-9 and that of FIGS. 10 and 11 is that this second embodiment air bed adds an adjustable pressure regulator $S_1$ in line 133, and it utilizes four pneumatically adjusted pressure regulators $R_5$-$R_8$ to replace the screw and spring adjusted pressure regulators $R_1$-$R_4$. It also utilizes three additional check valves $C_1$, $C_2$ and $C_3$.

The pressure regulator $S_1$ is identical to the pressure regulator $R_1$ or $R_3$ of FIG. 7. The pressure regulators $R_5$-$R_8$ are substantially identical to the pressure regulators 110 of FIG. 7 except that a pneumatic pressure chamber 301 replaces the screw 126 and spring 130 adjustment of the regulators $R_1$-$R_4$. To the extent that the pressure regulators $R_1$-$R_4$ (FIG. 7) and $R_5$-$R_8$ (FIG. 11) are identical, those elements which are identical have been given identical numerical designations.

To adjust the pressure in the pressure regulators $R_5$-$R_8$, there is a pressure adjustment chamber 301 located within a cap 302 secured on to the lower end of the pressure regulators $R_5$-$R_8$. The outer periphery of a diaphragm 303 is secured or sandwiched between this cap and the bottom surface of the regulator. The central portion of this diaphragm 303 is secured to a second piston 304 of a piston rod 305, which piston rod also is connected to the piston 116 of the diaphragm 115.

The air system is arranged to sustain an adjusted low air pressure in chambers 301 of pressure regulators $R_5$ and $R_7$ and to provide either an adjusted low air pressure in chambers 301 of pressure regulators $R_6$ and $R_8$ or a high air pressure in the chambers of those regulators in order to allow the respective hip and shoulder zones to be boosted.

When solenoid valve SOL-3 is de-energized, pump pressure in line 133 passes through the solenoid valve, is checked at check valve $C_1$ and passes into regulator $S_1$. The pressure is reduced to the adjusted setting of $S_1$, and the reduced pressure passes directly into line 136 and through check valve $C_2$ into line 135. This reduced pressure is then sensed in chambers 301 of pressure regulators $R_5$ to $R_8$, and each of these regulators controls the main line flow to the respective zone of the mattress accordingly.

Solenoid valve SOL-3 cooperates with the timer T to periodically and regularly supply a high pressure pulse of air or boost to the shoulder and hip zones of the mattress so as to prevent a person reclining and moving on the bed from slowly sinking into the mattress below the normalized position over a long period of time.

When solenoid SOL-3 is energized, pump pressure in line 133 passes through the solenoid valve into line 134 and through the check valve $C_3$. The flow is checked at $C_2$ but passes through check valve $C_1$ and pressure regulator $S_1$ and into line 135. Line 136 carries the reduced pressure air to pressure regulators $R_5$ and $R_7$, while line 135 carries the full pump pressure air to pressure regulators $R_6$ and $R_8$ causing the main pressure in the shoulder and hip zones to be boosted while maintaining the normalized pressure in the foot, head and waist zones.

When solenoid SOL-3 is de-energized as determined by the timer T, high pressure air in the lower chamber of the regulators $R_6$ and $R_8$ immediately reduces to the lower pressure determined by the setting of regulator $S_1$. Any overpressure of the hip and shoulder zones which occurred while solenoid valve SOL-3 was energized is then allowed to flow from that zone back to the pressure regulator as a consequence of that overpressure until such time as the overpressure is reduced to the selected zone pressure.

In order to establish pressure differences between the pressure supplied to each of the zones 41–45 of the bed via the pressure regulators $R_5$–$R_8$, the cross-sectional areas 301a of the chambers 301 of the regulators $R_5$–$R_8$ differ between the regulators $R_5$–$R_8$. Specifically, the area 301a of the pressure regulator $R_5$ is 4/11 of the area 301a of regulator $R_7$, the area 301a of the regulator $R_6$ is 8/11 of the area 301a of regulator $R_7$, and the area 301a of regulator $R_8$ is 6/11 of the area 301a of regulator $R_7$. Thus, if the pressure supplied through pressure regulator $S_1$ to the inlet port 306 of the regulator $R_7$ is adjusted so as to establish and maintain a pressure of 11 inches of water in the waist zone 43 of the mattress, then the pressure in the foot and head zones, because of the differing areas 301a between the regulators $R_5$ and $R_7$, will be 4 inches of water. Similarly, because of the differential areas 301a in the regulators $R_6$ and $R_8$ relative to the areas 301a of the regulators $R_7$, the pressures in the hip and shoulder zones, respectively, will be 8 inches of water and 6 inches of water when the pressure in the waist zone is 11 inches of water. If the firmness of the mattress 25 of the embodiment of FIG. 9 is to be increased, as for example, to 13 inches of water in the waist zone, the regulated pressure on the output side of pressure regulator $S_1$ will be increased until the pressure in the waist zone 43 is 13 inches of water. This increase of pressure in the waist zone will simultaneously result in the pressure in the hip zone being increased to $8/11 \times 13$ or 9.45 inches of water. In the same way, the pressure in the shoulder zone will be increased to 7.09 inches of water ($6/11 \times 13$), and the pressure in the foot and head zones will be increased to 4.73 inches ($4/11 \times 13$) of water. In this way, the relationship between zone pressures is maintained at a constant ratio, which ratio is established by the relative areas 301a of the pressure regulators $R_5$–$R_8$, and spinal alignment of a person reclining atop the mattress is maintained, even though firmness of the mattress is increased.

In actual practice, the pressure regulator $S_1$ would differ in the embodiment of FIGS. 10 and 11 from the pressure regulators $R_1$ and $R_3$ of FIG. 7 in that the slotted adjustment screw 126 would be replaced by a more easily maneuverable adjusting knob (not shown) attached to the lower end of the screw. In all other respects, the regulator $S_1$ would be identical to the pressure regulators $R_1$ and $R_3$.

While we have described only a limited number of embodiments of our invention, persons skilled in this art will appreciate changes and modifications which may be made while still practicing this invention. Furthermore, the invention has been described as relative to a fluid bed, although certain aspects of the invention are applicable to other forms of body supports, including seating devices, vehicle seats and other forms of furniture. Therefore, we do not intend to be limited, except by the scope of the following appended claims:

We claim:

1. Apparatus for supplying air to multiple zones of a body support at differing pressures, said apparatus comprising
    an air pump having an inlet and an outlet,
    a housing, said air pump being mounted within said housing,
    an air filter mounted upon said housing,
    at least three pressure regulators mounted upon said housing, each of said pressure regulators having an inlet and an outlet,
    sealed pressure chambers contained internally of said housing and defined in part by walls of said housing,
    passageway means contained internally of said housing walls for supplying air from outside said housing, through said filter to said inlet of said pump and from said outlet of said pump to the sealed pressure chambers and from said sealed pressure chambers to the inlets of said pressure regulators,
    a plurality of normally open surge check valves mounted on said housing, and
    passageway means in said housing for supplying air from the outlet of each one of said pressure regulators to one of said surge check valves and from said surge check valves to said zones of said body support.

2. The apparatus of claim 1 wherein each of said pressure regulators is a diaphragm type pressure regulator.

3. The apparatus of claim 1 wherein each of said surge check valves is a diaphragm check valve.

4. The apparatus of claim 1 wherein each of said surge check valves is a diaphragm valve and each of said pressure regulators is a diaphragm pressure regulator.

5. The apparatus of claim 1 wherein each of said pressure regulators is an adjustable pressure regulator and wherein the adjustment of all of said pressure regulators is effected pneumatically.

6. The apparatus of claim 1 wherein each of said pressure regulators is an adjustable pressure regulator and wherein the adjustments of all of said regulators are interconnected and adjusted simultaneously.

7. The apparatus of claim 1 wherein each of said pressure regulators is an adjustable pressure regulator and wherein the adjustments of all of said pressure regulators are interconnected such that the same relative pressure outputs from said regulators are maintained upon adjustment of said regulators.

8. The apparatus of claim 1 wherein said housing is divided into front and rear sections and said rear section is divided into upper and lower rear chambers, said upper and lower rear chambers being sealingly separated by a mounting plate, and said pump being mounted upon said mounting plate and said pressure regulators being mounted on said front section.

9. The apparatus of claim 8 which further includes at least one solenoid mounted upon said mounting plate and operable to control airflow through said passageway means of said housing.

10. Apparatus for supplying air to multiply zones of a body support at differing pressures, said apparatus comprising an air pump having an inlet and an outlet, a pump housing having external and internal walls, said housing comprising a front section and a rear section, said rear section being divided into a lower rear section and an upper rear section, a mounting plate, said mounting plate being sealingly located between said upper and lower rear sections of said housing, said mounting plate and internal walls of said housing defining at least two pressure chambers, said pump being mounted on said mounting plate, an air filter mounted on said housing, at least three pressure regulators mounted on said front section of said housing walls; and passageway means contained internally of said housing for supplying air from outside said housing through said filter to said inlet of said pump and from said outlet of said pump to at least one of said pressure chambers and from said at least one pressure chamber to said pressure regulators.

11. The apparatus of claim 10 which further includes a plurality of normally open surge check valves contained internally of said housing, and passageway means in said housing for supplying air from each one of said pressure regulators to one of said surge check valves and from said surge check valves to said zones of said body support.

12. The apparatus of claim 11 wherein each of said pressure regulators is a diaphragm type pressure regulator and each of said surge check valves is a diaphragm type of check valve.

13. The apparatus of claim 10 wherein each of said pressure regulators is a diaphragm type pressure regulator.

14. The apparatus of claim 10 wherein each of said pressure regulators is an adjustable pressure regulator and wherein the adjustment of all of said pressure regulator is effected pneumatically.

15. The apparatus of claim 10 wherein each of said pressure regulators is an adjustable pressure regulator having a pressure input and a pressure output, and wherein the adjustment of all of said pressure regulators may be made simultaneously while maintaining the same relative pressure outputs between said pressure regulators.

16. The apparatus of claim 10 wherein said lower rear section of said housing contains two pressure chambers, one of said pressure chambers being connected by said passageway means to the inlet of all of said pressure regulators and the other of said pressure chambers being connected by said passageway means to an inlet of less than all of said pressure regulators.

17. The apparatus of claim 16 wherein said other of said chambers is interconnected with said pump by a passageway, which passageway is selectively opened and closed by a solenoid valve.

18. The apparatus of claim 17 wherein said solenoid valve is mounted on said mounting plate.

19. The apparatus of claim 16 which further includes a solenoid valve mounted upon said plate, said solenoid valve being operable to selectively connect said one chamber to atmosphere.

* * * * *